(12) United States Patent
Watanabe

(10) Patent No.: US 8,771,070 B2
(45) Date of Patent: Jul. 8, 2014

(54) GAME PROCESSING SERVER APPARATUS AND RECORDING MEDIUM

(71) Applicant: DeNA Co., Ltd., Tokyo (JP)

(72) Inventor: Tomoyo Watanabe, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/906,623

(22) Filed: May 31, 2013

(65) Prior Publication Data

US 2014/0011593 A1    Jan. 9, 2014

(30) Foreign Application Priority Data

Jul. 6, 2012  (JP) ................................. 2012-152177

(51) Int. Cl.
*A63F 13/00*    (2014.01)

(52) U.S. Cl.
USPC .............................................. 463/31; 463/42

(58) Field of Classification Search
USPC .................................................... 463/42, 31
See application file for complete search history.

(56) References Cited

U.S. PATENT DOCUMENTS 6,306,033 B1 * 10/2001 Niwa et al. ........................ 463/1
7,955,175 B1 * 6/2011 Holloway et al. ............... 463/42

* cited by examiner

*Primary Examiner* — Omkar Deodhar
(74) *Attorney, Agent, or Firm* — IPUSA, PLLC

(57) ABSTRACT

A game processing server apparatus includes a unit that delivers game information to a player terminal; a unit that delivers information regarding a single base game content and information regarding one or more material game contents selected from the plurality of game contents to the player terminal, the information including information indicating that the one or more material game contents are selected as the material game contents as an initial value; and a unit that accepts information regarding whether the one or more material game contents are selected as the actual material game contents by the player from the player terminal, treats the material game contents selected by the player to be not possessed by the player anymore, and updates the parameter of the base game content.

17 Claims, 11 Drawing Sheets

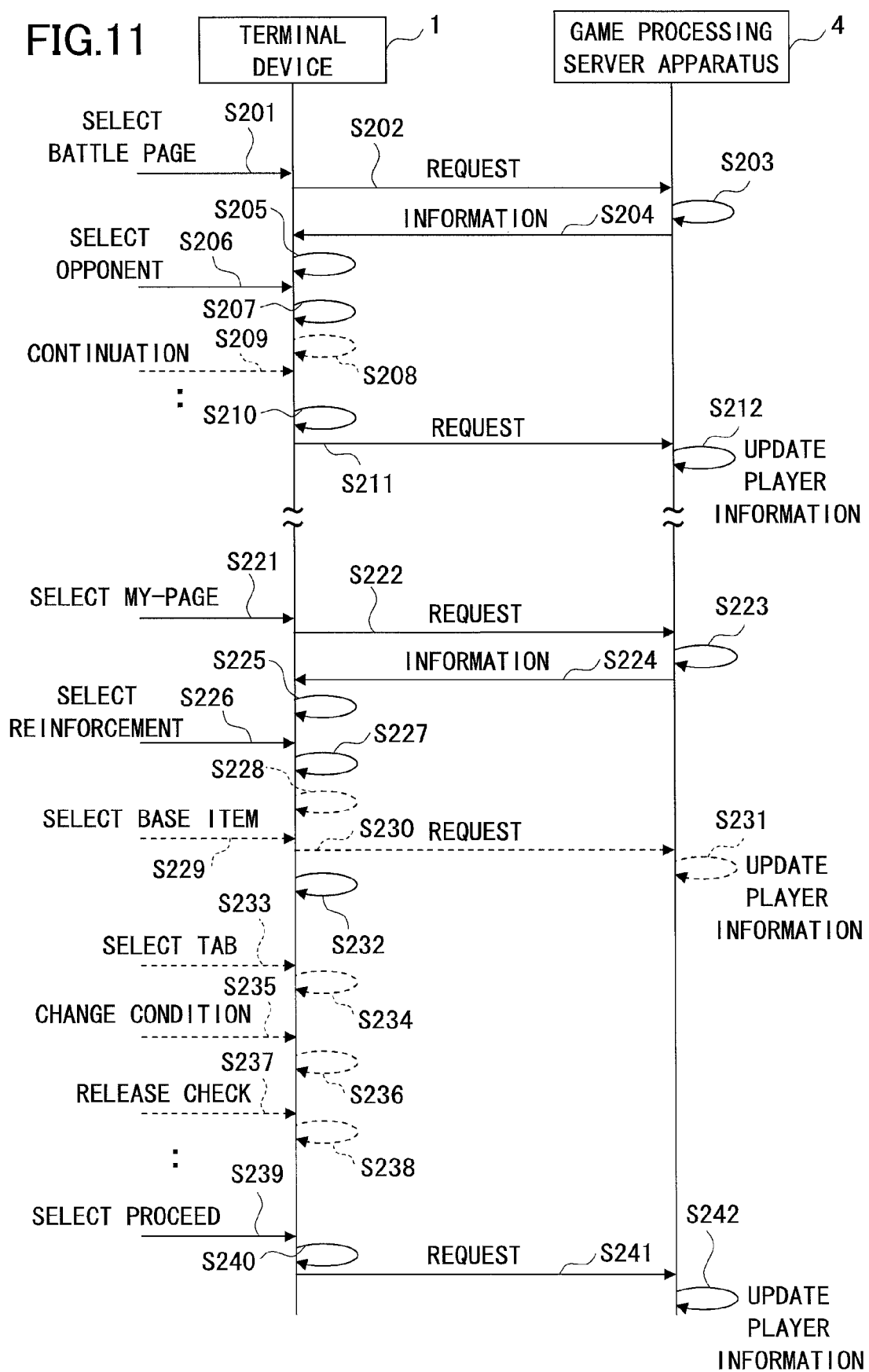

GAME PROCESSING SERVER APPARATUS AND RECORDING MEDIUM

BACKGROUND OF THE INVENTION

1. Field of the Invention

The present invention relates to a game processing server apparatus and a recording medium.

2. Description of the Related Art

A game is known in which a battle takes place based on ability values or the like corresponded to items (game contents, game media) such as cards, figures or the like possessed by players as digital contents (for example, see "FINAL FANTASY BRIGADE™" (http://ff.sp.mbga.jp/)).

In such a game, a function is provided in which an ability value such as offense or the like of a base item, which is selected from items possessed by a player, is increased by incorporating other items (referred to as "material items" hereinafter), which are also possessed by the player, to the base item. The material items used for reinforcing the base item are treated to be not possessed by the player anymore because the material items are consumed by the reinforcement.

However, there has been a problem that there are many steps to determine a desired material item(s) for the player.

SUMMARY OF THE INVENTION

The present invention is made in light of the above problems, and provides a technique capable of performing a desired reinforcement with fewer steps for a player.

According to an embodiment, there is provided a game processing server apparatus including: a storing unit that stores a plurality of game contents possessed by a player and parameters of the plurality of the game contents, respectively; a game information delivering unit that delivers game information generated based on the parameters of the game contents, respectively, possessed by the player to a player terminal; a game contents delivering unit that that delivers, based on a request from the player terminal, information regarding a single base game content selected from the plurality of game contents possessed by the player and information regarding one or more material game contents selected from the plurality of game contents possessed by the player to the player terminal, the information regarding the one or more material game contents including information indicating that the one or more material game contents are selected as the material game contents as an initial value; and an updating unit that accepts information regarding whether the one or more material game contents are selected as the actual material game contents by the player from the player terminal, treats the material game contents selected by the player to be not possessed by the player anymore, and updates the parameter of the base game content.

According to another embodiment, there is provided a non-transitory computer-readable recording medium having recorded thereon a program for a game processing server apparatus that causes a computer to execute functions including: a storing function that stores a plurality of game contents possessed by a player and a plurality of parameters of the plurality of the game contents, respectively; a game information delivering function that delivers game information generated based on the parameters of the game contents, respectively, possessed by the player to a player terminal; a game content delivering function that delivers, based on a request from the player terminal, information regarding a single base game content selected from the plurality of game contents possessed by the player and information regarding one or more material game contents selected from the plurality of game contents possessed by the player to the player terminal, the information regarding the one or more material game contents including information indicating that the one or more material game contents are selected as the material game contents as an initial value; and an updating function that accepts information regarding whether the one or more material game contents are selected as the actual material game contents by the player from the player terminal, treats the material game contents selected by the player to be not possessed by the player anymore, and updates the parameter of the base game content.

According to another embodiment, there is provided a non-transitory computer-readable recording medium having recorded thereon a program for a terminal device that causes a computer to execute functions including: a storing function that stores a plurality of game contents possessed by a player and parameters of the plurality of the game contents, respectively; a game information generating function that generates game information based on the parameters of the game contents possessed by the player to a player terminal, respectively; a game contents obtaining function that obtains, based on a request by a player, information regarding a single base game content selected from the plurality of game contents possessed by the player and information regarding one or more material game contents selected from the plurality of game contents possessed by the player to the player terminal, the information regarding the one or more material game contents including information indicating that the one or more material game contents are selected as the material game contents as an initial value; and an updating function that accepts information regarding whether the one or more material game contents are selected as the actual material game contents by the player from the player terminal, treats the material game contents selected by the player to be not possessed by the player anymore, and updates the parameter of the base game content.

Note that also arbitrary combinations of the above-described elements, and any changes of expressions in the present invention, made among methods, devices, systems, recording media, computer programs and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 11 is a flowchart illustrating another example of an operation of the embodiment.

DETAILED DESCRIPTION OF THE PREFERRED EMBODIMENTS

Figure 1:
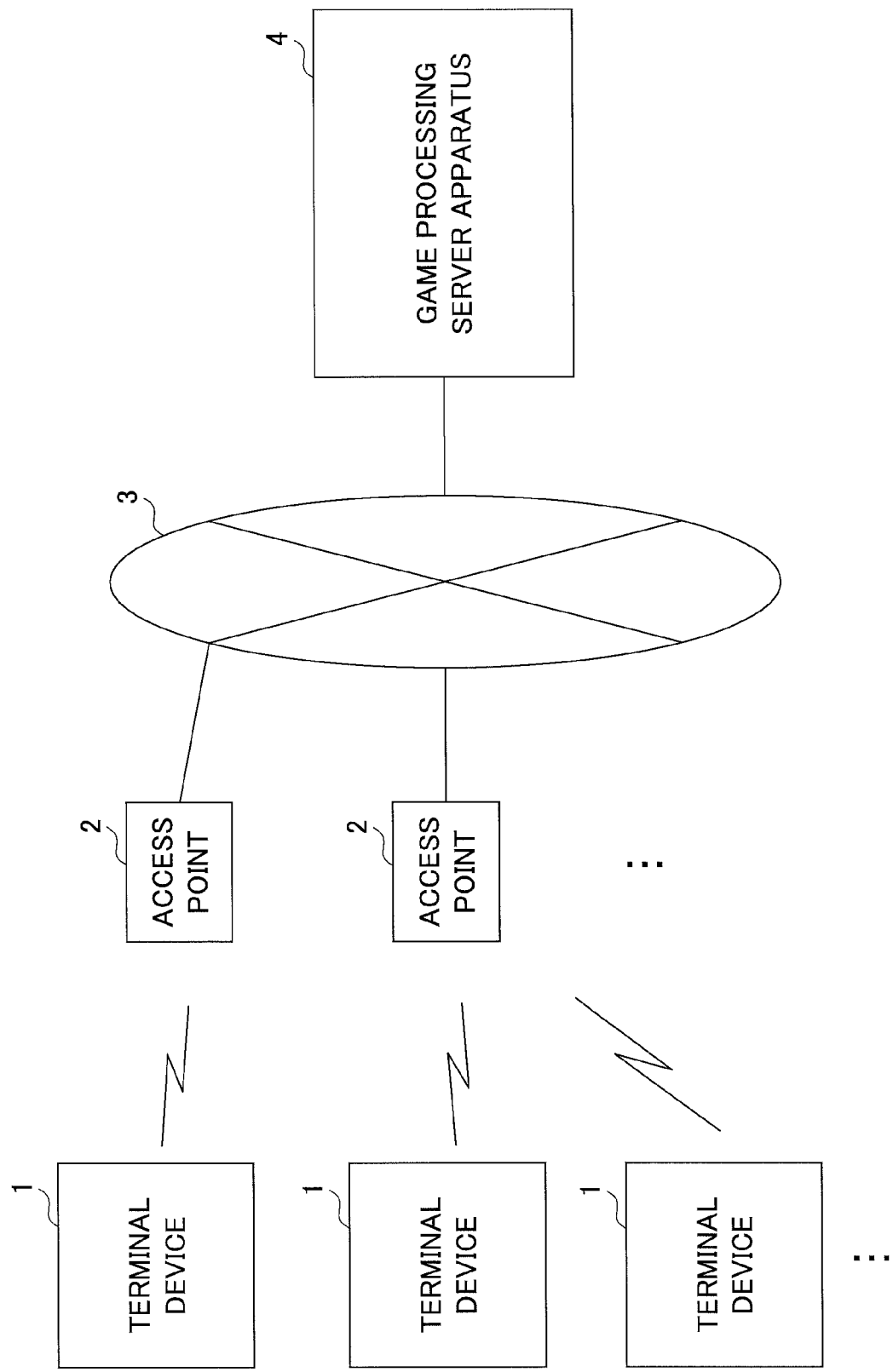
FIG. 1 is a block diagram illustrating a structure of an example of a system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

In the game having the function in which the ability value of the base item, which is selected from items possessed by a player, is increased by incorporating other items as described above, it is possible for the player to select the material items one by one. However, it is difficult, in particular, for a beginner player to select the material items one by one. Thus, a function called "arbitrarily reinforcement" by which one or more material items are extracted and presented to the player may be provided. With this function, it is unnecessary for the player to select the material items one by one.

However, as mentioned above, when the base item is reinforced by the incorporation, the material items or the like used for the reinforcement are not possessed by the player anymore.

Thus, even if the player uses the function called "arbitrarily reinforcement", if an item that the player wishes to keep possessing is included in the material items presented as the "arbitrarily reinforcement", the player needs to re-extract the material items after changing an extraction condition, or the user needs to select the material items one by one. According to the present embodiment, such a problem is to be solved.

(Structure)

FIG. 1 is a block diagram illustrating a structure of an example of a system of an embodiment.

The system shown in FIG. 1 includes a plurality of terminal devices (player terminals) 1 which belong to players, respectively, access points 2 such as a mobile base station, a Wi-Fi station or the like, a network 3 such as the INTERNET or the like, and a game processing server apparatus 4. The game processing server apparatus 4 controls (manages) processing of a game in which a plurality of players play a game via the network 3. The terminal device 1 may be a smart phone, a mobile phone, or the like.

Figure 2:
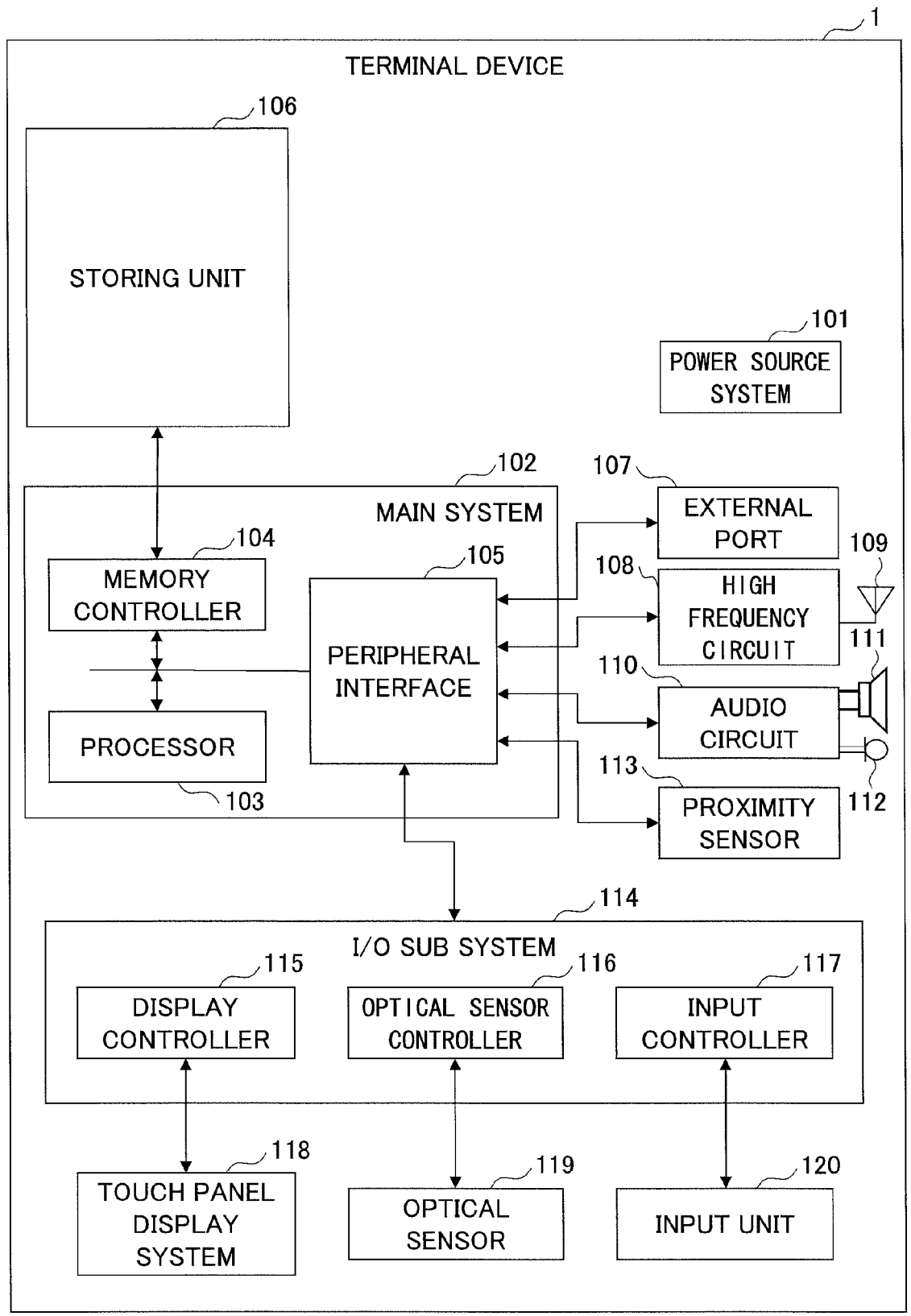
FIG. 2 is a block diagram illustrating an example of a hardware structure of a terminal device.

FIG. 2 is a block diagram illustrating an example of a hardware structure of the terminal device 1.

The terminal device 1 includes a power source system 101, a main system 102, a storing unit 106, an external port 107, a high frequency circuit 108, an antenna 109, an audio circuit 110, a speaker 111, a microphone 112, a proximity sensor 113, an I/O sub system 114, a touch panel display system 118, an optical sensor 119 and an input unit 120. The main system 102 includes a processor 103, a memory controller 104 and a peripheral interface 105. The I/O sub system 114 includes a display controller 115, an optical sensor controller 116, and an input controller 117.

Figure 3:
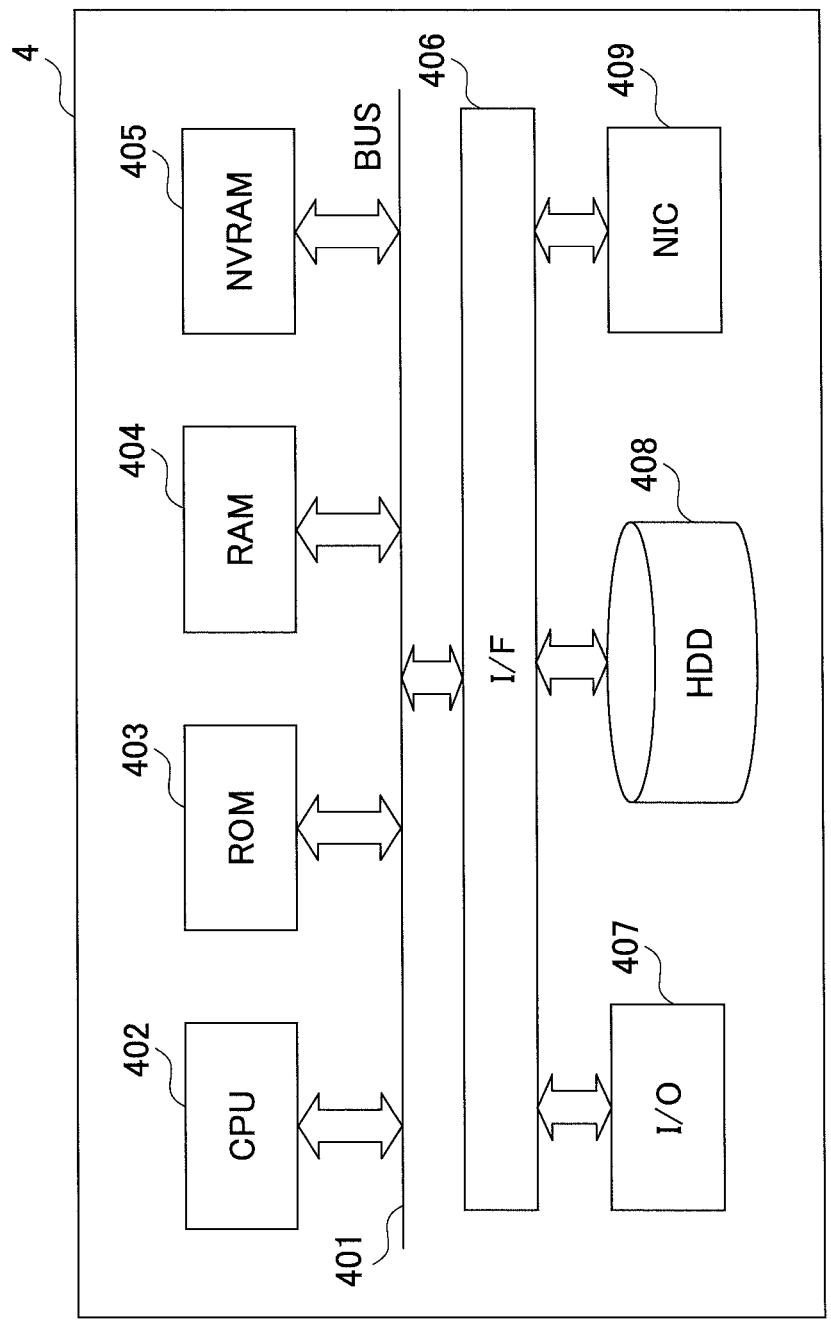
FIG. 3 is a block diagram illustrating an example of a hardware structure of a game processing server apparatus.

FIG. 3 is a block diagram illustrating an example of a hardware structure of the game processing server apparatus 4.

The game processing server apparatus 4 includes a Central Processing Unit (CPU) 402, a Read Only Memory (ROM) 403, a Random Access Memory (RAM) 404, a non-Volatile Random Access Memory (NVRAM) 405 and an Interface (I/F) 406 connected to a system bus 401, and an Input/Output Device (I/O) 407 such as a keyboard, a mouse, a monitor, a Compact Disk/Digital Versatile Disk (CD/DVD) drive or the like, a Hard Disk Drive (HDD) 408, and a Network Interface Card (NIC) 409 connected to the I/F 406, and the like.

Figure 4:
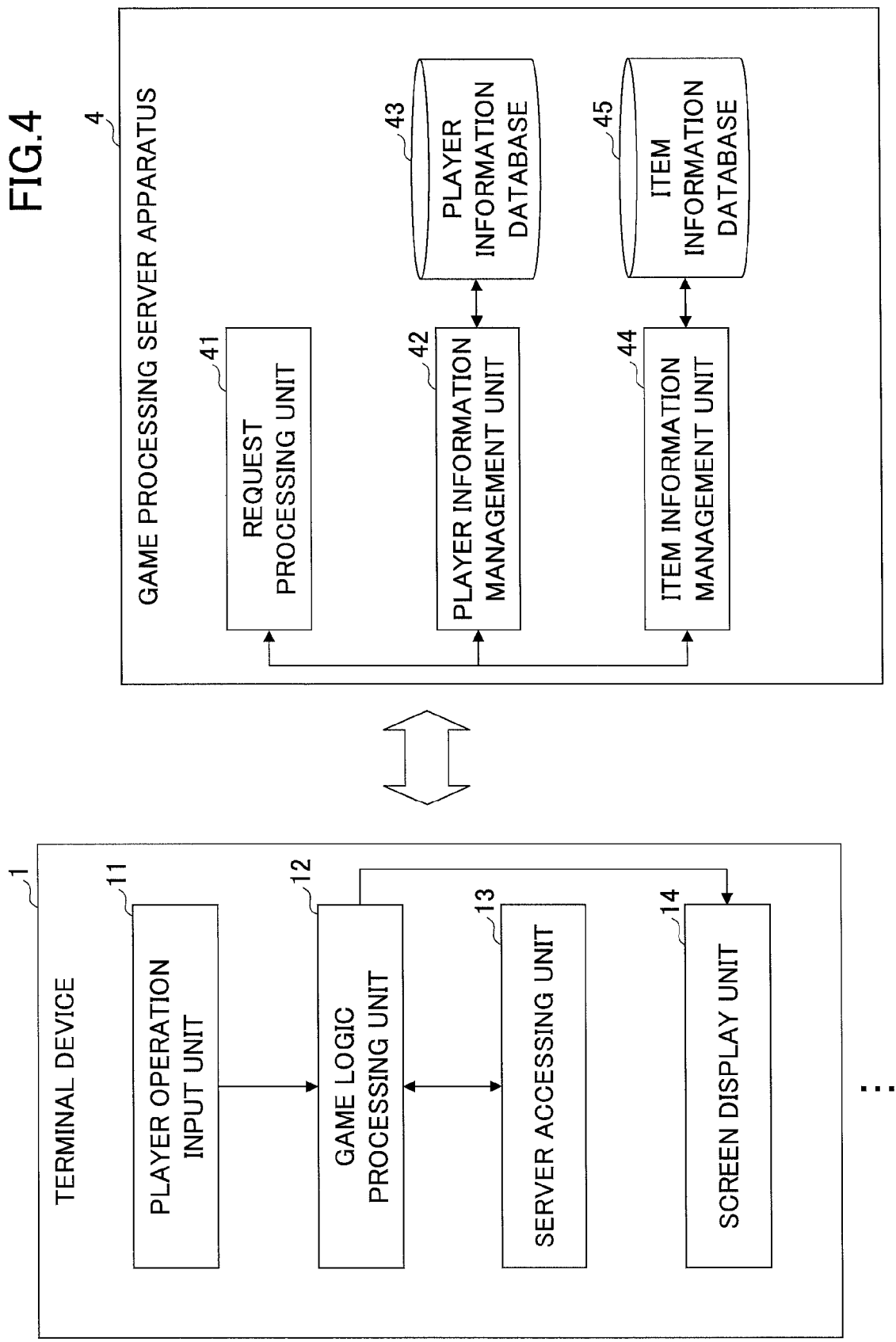
FIG. 4 is a block diagram illustrating an example of a functional structure of the terminal device and the game processing server apparatus.

FIG. 4 is a block diagram illustrating an example of a functional structure of the terminal device 1 and the game processing server apparatus 4.

In FIG. 4, the terminal device 1 includes a player operation input unit 11, a game logic processing unit 12, a server accessing unit 13 and a screen display unit 14.

The player operation input unit 11 has a function to input (accept) an operation of a player of the terminal device 1.

The game logic processing unit 12 has a function to process a game by transitioning screens in accordance with the input operation by the player via the player operation input unit 11. The game logic processing unit 12 may execute the game logic based on page data described in a Hyper Text Markup Language (HTML) or the like and scripts or the like included in the page data sent from the game processing server apparatus 4 (which is called browser type). Alternatively, the game logic processing unit 12 may execute the game logic based on an application which is previously downloaded and installed in the terminal device 1 (which is called application type).

The server accessing unit 13 has a function to send a request to the game processing server apparatus 4 and receive a processed result or the like as a response from the game processing server apparatus 4 when it is necessary to access the game processing server apparatus 4 in a course of the processing by the game logic processing unit 12. Here, the request includes a request of updating and a request of referring to data. The request of updating is to update player information. The request of referring to data is to refer to the player information.

The screen display unit 14 has a function to display screens under control of the game logic processing unit 12.

The game processing server apparatus 4 includes a request processing unit 41, a player information management unit 42, a player information database 43, an item information management unit 44 and an item information database 45.

The request processing unit 41 has a function to receive a request from the terminal device 1, perform a corresponding process and send a processed result of the request to the terminal device 1. When the request processing unit 41 receives the request of updating, the request processing unit 41 performs an operation to update the player information, and sends the updated player information or the like which is changed by the operation as the processed result. When the request processing unit 41 receives the request of referring to data, the request processing unit 41 refers to and obtains the corresponding player information, and sends the obtained player information as the processed result. The response may include screen information which is to be operated by the player next, in addition to the required processed result, for the browser type. The request processing unit 41 includes a function of a game information delivering unit, a game content delivering unit and an updating unit.

The player information management unit 42 has a function to manage various information regarding all of the players participating in the game, which are stored in the player information database 43. The player information management unit 42 refers to or updates the player information in accordance with the request from the request processing unit 41. An example of the data structure of the player information is explained later in detail.

The item information management unit 44 has a function to manage various information regarding items (game contents, game media), which are stored in the item information database 45. The items are such as cards, figures or the like possessed by players as digital contents. The item information management unit 44 refers to or updates the item information in accordance with the request from the request processing unit 41. An example of the data structure of the item information is explained later in detail.

Figure 5:
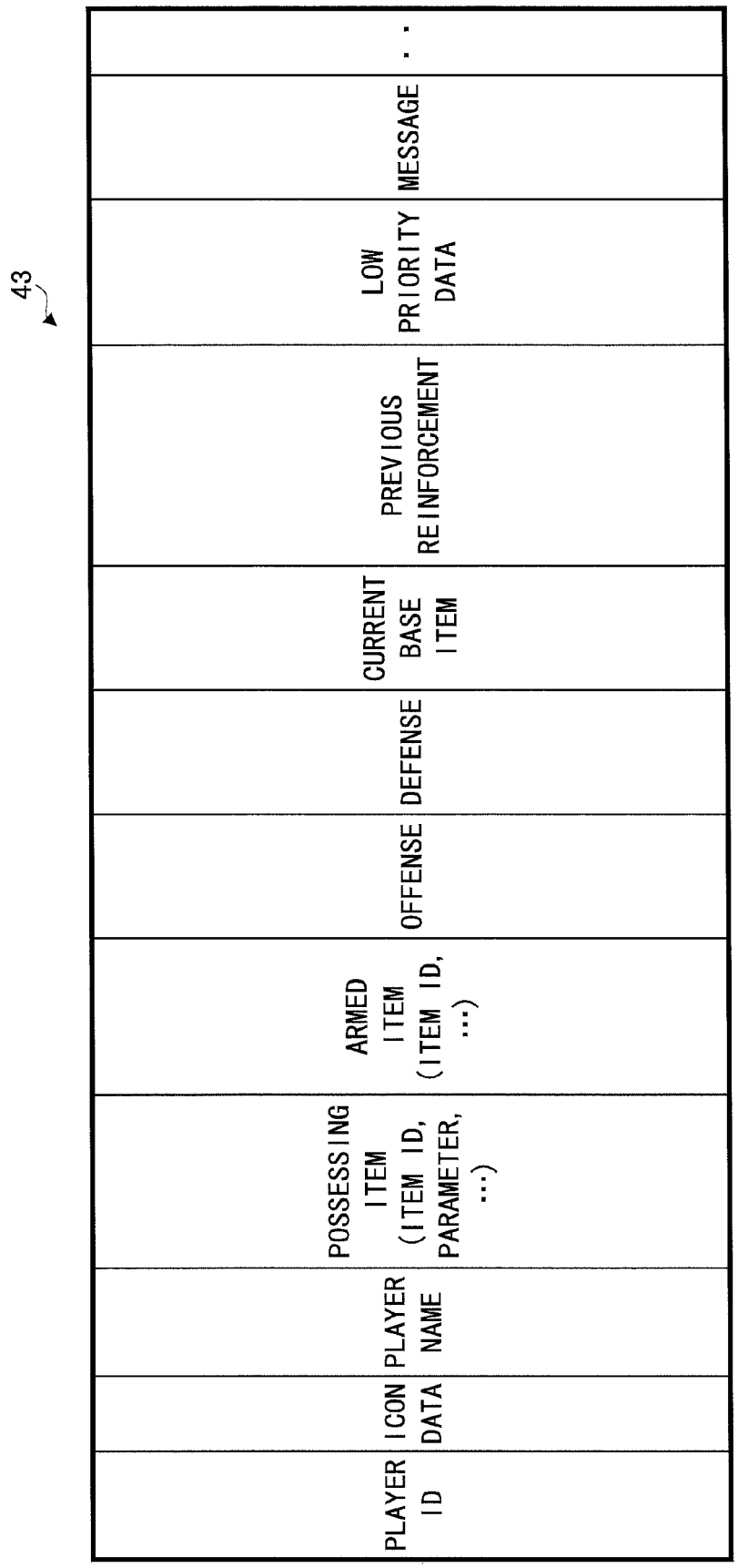
FIG. 5 is a view illustrating an example of a data structure of player information.

FIG. 5 is a view illustrating an example of a data structure of the player information stored in the player information database 43.

In FIG. 5, the player information includes fields such as "player ID", "icon data", "player name", "possessing item (item ID, parameter, . . . )", "armed item (item ID, . . . )", "offense", "defense", "current base item", "previous reinforcement", "low priority data", "message" and the like.

The "player ID" is data to specify (identify) the player. The "icon data" is data to specify a displayed icon of the player. The "player name" is data indicating a displayed name of the player.

The "possessing item (item ID, parameter, . . . )" is data regarding items possessed by the player. The "possessing item (item ID, parameter, . . . )" includes "item ID" that specifies the item and "parameter" that indicates attributes of the item such as ability values including offense, defense or the like, rare degree, type (action type or the like) and the like. The "armed item (item ID, . . . )" is data that specifies the item, selected from the items possessed by the player, currently used (armed) by a player character for a battle or the like. The number of the armed items may be limited in accordance with the game.

The "offense" indicates a total ability value of the player for offense calculated based on the parameters of the items possessed by the player or the armed items armed by the player character. The "defense" indicates a total ability value of the player for defense calculated based on the parameters of the items possessed by the player or the armed items armed by the player character.

The "current base item" indicates the item ID of the item currently selected as the base item for the player. In this embodiment, it is assumed that the number of the base item is one and the player is to select a new base item at the initial time or when the previously selected base item is reinforced to the upper limit. The "previous reinforcement" is data indicating the kind of reinforcement that the player used in the last reinforcement ("arbitrarily", "manual selection", "reinforcement agent" or the like). The "low priority data" is data for lowering a priority to be selected as a material item in the reinforcement for a specific item whose selection to be selected as the material item is previously released by the player. The "message" is information such as a notification message or the like for the player from other players or the system.

Figure 6:
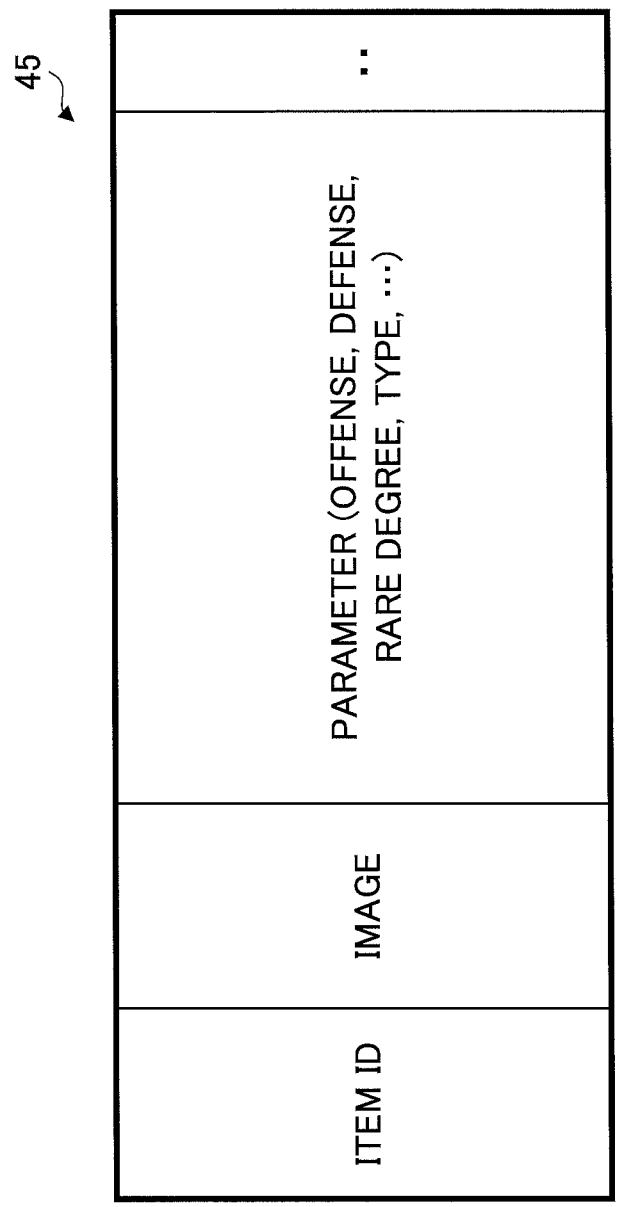
FIG. 6 is a view illustrating an example of a data structure of item information.

FIG. 6 is a view illustrating an example of a data structure of the item information stored in the item information database 45.

In FIG. 6, the item information includes fields such as "item ID", "image", "parameter (offense, defense, rare degree, type, . . . )" and the like.

The "item ID" is data to specify (identify) the item. The "image" is image data for displaying the item. The "parameter (offense, defense, rare degree, type, . . . )" is attributes of the item.

(Operation)

Figure 7:
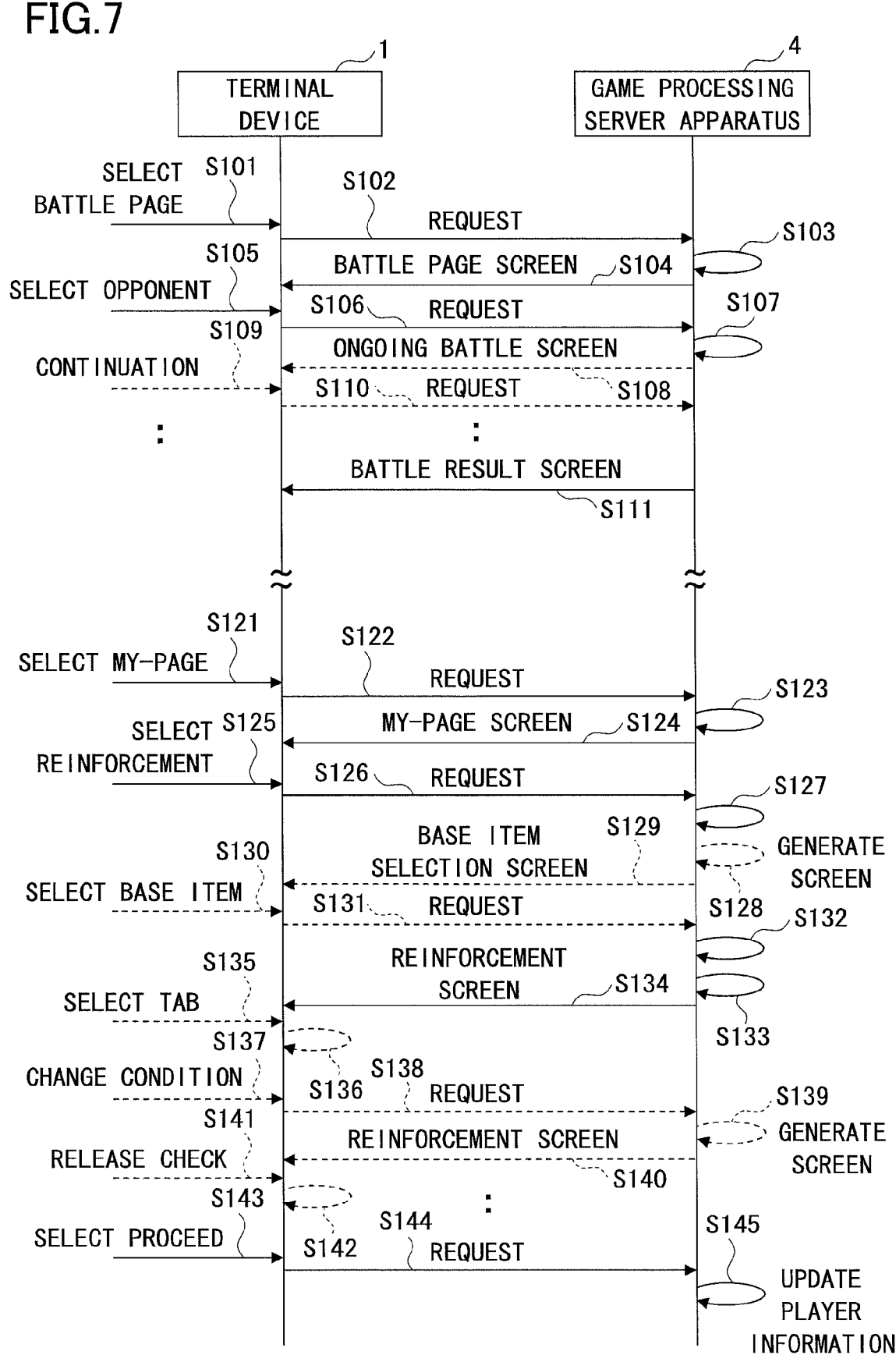
FIG. 7 is a flowchart illustrating an example of an operation of the embodiment.

FIG. 7 is an example of a flowchart illustrating an example of an operation of the game processing server apparatus 4 and the terminal device 1 for the browser type.

At the terminal device 1, the player selects a battle page. When the player operation input unit 11 accepts the selection of the battle page by the player (step S101), the server accessing unit 13, under control of the game logic processing unit 12, sends a request of the battle page with the player ID to the game processing server apparatus 4 (step S102).

At the game processing server apparatus 4, upon accepting the request, the request processing unit 41 selects other players, other than the requested player, who are qualified as a candidate for an opponent in a battle based on attributes and obtains information regarding the selected other players from the player information database 43 via the player information management unit 42. Then, the request processing unit 41 generates a battle page screen in which the information regarding the selected other players are arranged to be selectable (step S103) and sends the battle page screen to the terminal device 1 (step S104).

At the terminal device 1, the player selects an opponent to battle against from the battle page and instructs to start a battle. When the operation input unit 11 accepts the selection of the opponent and the instruction to start the battle by the player (step S105), under control of the game logic processing unit 12, the server accessing unit 13 sends a request of the battle to the game processing server apparatus 4 with the player ID of own and the player ID of the other player selected as the opponent (step S106).

At the game processing server apparatus 4, upon accepting the request, the request processing unit 41 refers to the player information in the player information database 43 via the player information management unit 42 based on the player IDs of the players battle against each other, determines a battle result based on the attributes of the players such as offense, the defense and the like, generates screens for battle situations, and updates the player information in the player information database 43 via the player information management unit 42 (step S107). Updating of the player information may be performed after the battle result is confirmed by the player of the terminal device 1.

At the game processing server apparatus 4, the request processing unit 41 may send a report on ongoing battle screen to the terminal device 1 (step S108). When the player of the terminal device 1 selects continuation in the report on ongoing battle screen and the player operation input unit 11 accepts the selection (step S109), under control of the game logic processing unit 12, the server accessing unit 13 sends a request of continuing the battle to the game processing server apparatus 4 (step S110). The request processing unit 41 may send a plurality of report on ongoing battle screens. In such a case, the same procedure is repeated.

Thereafter, at the game processing server apparatus 4, the request processing unit 41 sends a battle result screen to the terminal device 1 (step S111).

Next, the operation of the reinforcement by the player of the terminal device 1 is explained.

In FIG. 7, the player of the terminal device 1 selects displaying of my-page. When the player operation input unit 11 accepts the selection by the player (step S121), under control of the game logic processing unit 12, the server accessing unit 13 sends a request of my-page to the game processing server apparatus 4 with the player ID (step S122).

At the game processing server apparatus 4, upon accepting the request, the request processing unit 41 obtains the player information including a message or the like of the requested player based on the player ID from the player information database 43 via the player information management unit 42. Then, the request processing unit 41 generates a my-page screen (step S123) and sends the my-page screen to the terminal device 1 (step S124).

At the terminal device 1, the player of the terminal device 1 selects a reinforcement of a base item from the my-page screen. When the player operation input unit 11 accepts the selection by the player (step S125), under control of the game logic processing unit 12, the server accessing unit 13 sends a request of the reinforcement to the game processing server apparatus 4 with the player ID (step S126).

At the game processing server apparatus 4, upon accepting the request, the request processing unit 41 obtains information regarding a current base item of the requested player based on the player ID from the player information database 43 via the player information management unit 42, and determined whether the current base item exists (step S127).

When the current base item does not exist because the base item is not selected yet, or when the current base item is inactivated because the reinforcement of the selected base item reaches the upper limit, the request processing unit 41 obtains the items possessed by the player from the player information database 43 via the player information management unit 42, generates a base item selection screen in which the items are arranged to be selectable (step S128), and sends the base item selection screen to the terminal device 1 (step S129).

Then, at the terminal device 1, the player selects a base item from the base item selection screen. When the player operation input unit 11 accepts the selection by the player (step S130), under control of the game logic processing unit 12, the server accessing unit 13 sends a request indicating that the selection of the base item is completed to the game processing server apparatus 4 with the player ID and the item ID of the selected item (step S131).

At the game processing server apparatus 4, upon accepting the request, the request processing unit 41 updates the player information database 43 to include the current base item via the player information management unit 42 (step S132).

When the base item already exists in step S127 or the base item is newly selected, the request processing unit 41 obtains the previous reinforcement or the low priority data of the requested player based on the player ID from the player information database 43 via the player information management unit 42, generates a reinforcement screen (step S133), and sends the reinforcement screen to the terminal device 1 (step S134).

Figure 8:
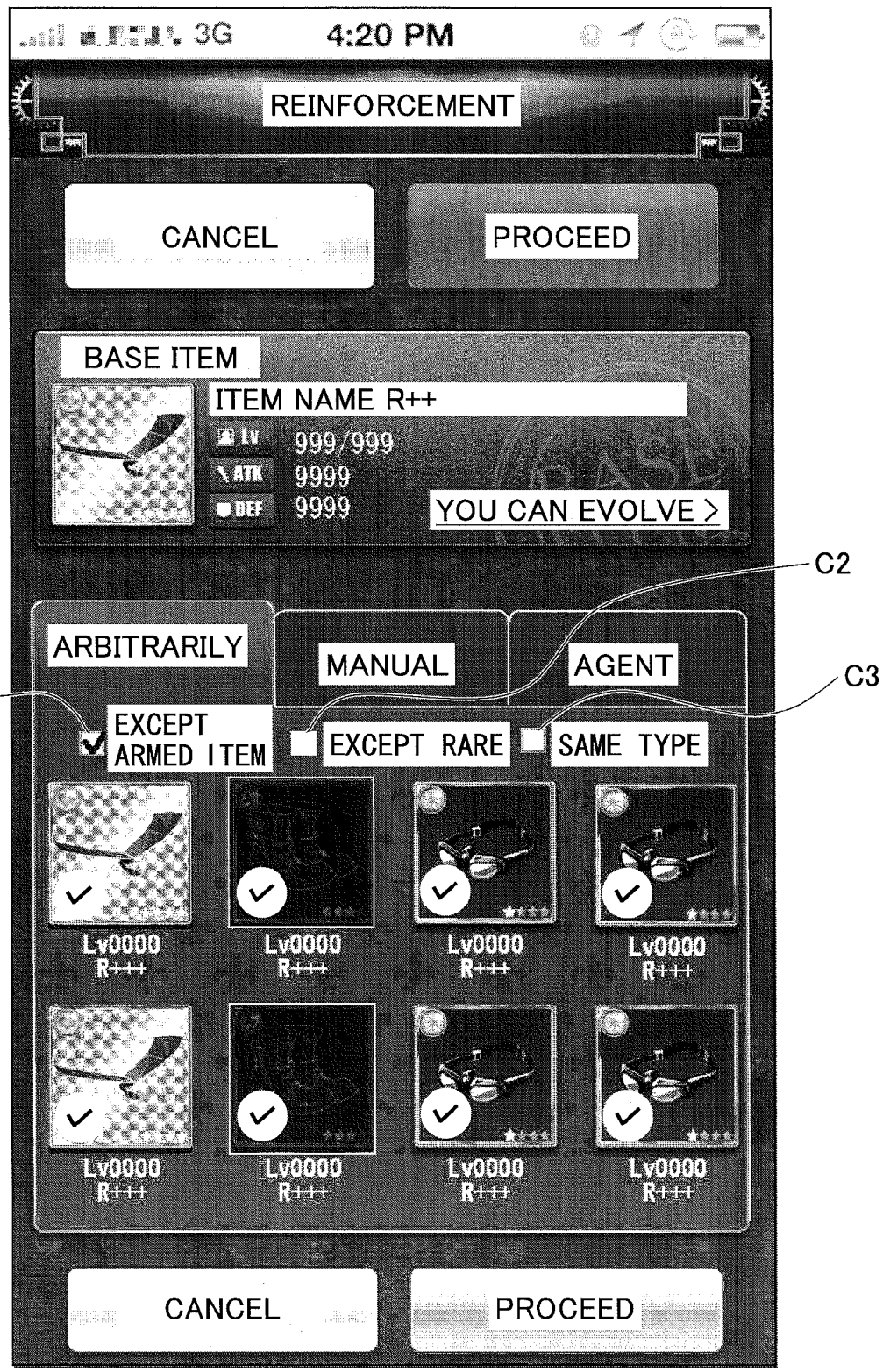
FIG. 8 is a view illustrating an example of a reinforcement screen.

Here, when the previous reinforcement is the "arbitrarily" or there is no data for the previous reinforcement as this is the first time, as shown in FIG. 8, a reinforcement screen in which an "arbitrarily" tab is selected is generated and sent.

Figure 9:
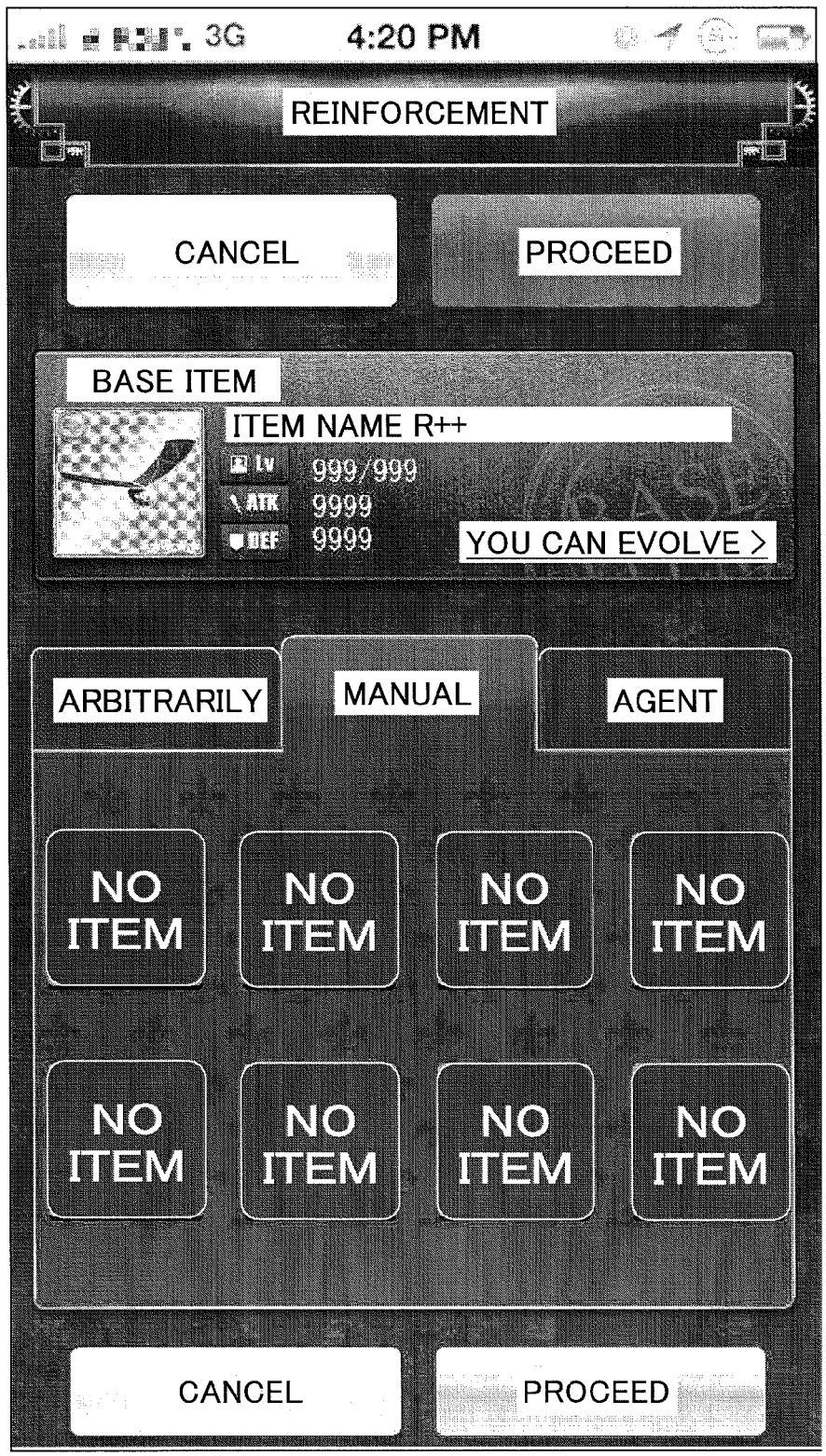
FIG. 9 is a view illustrating another example of a reinforcement screen.
Figure 10:
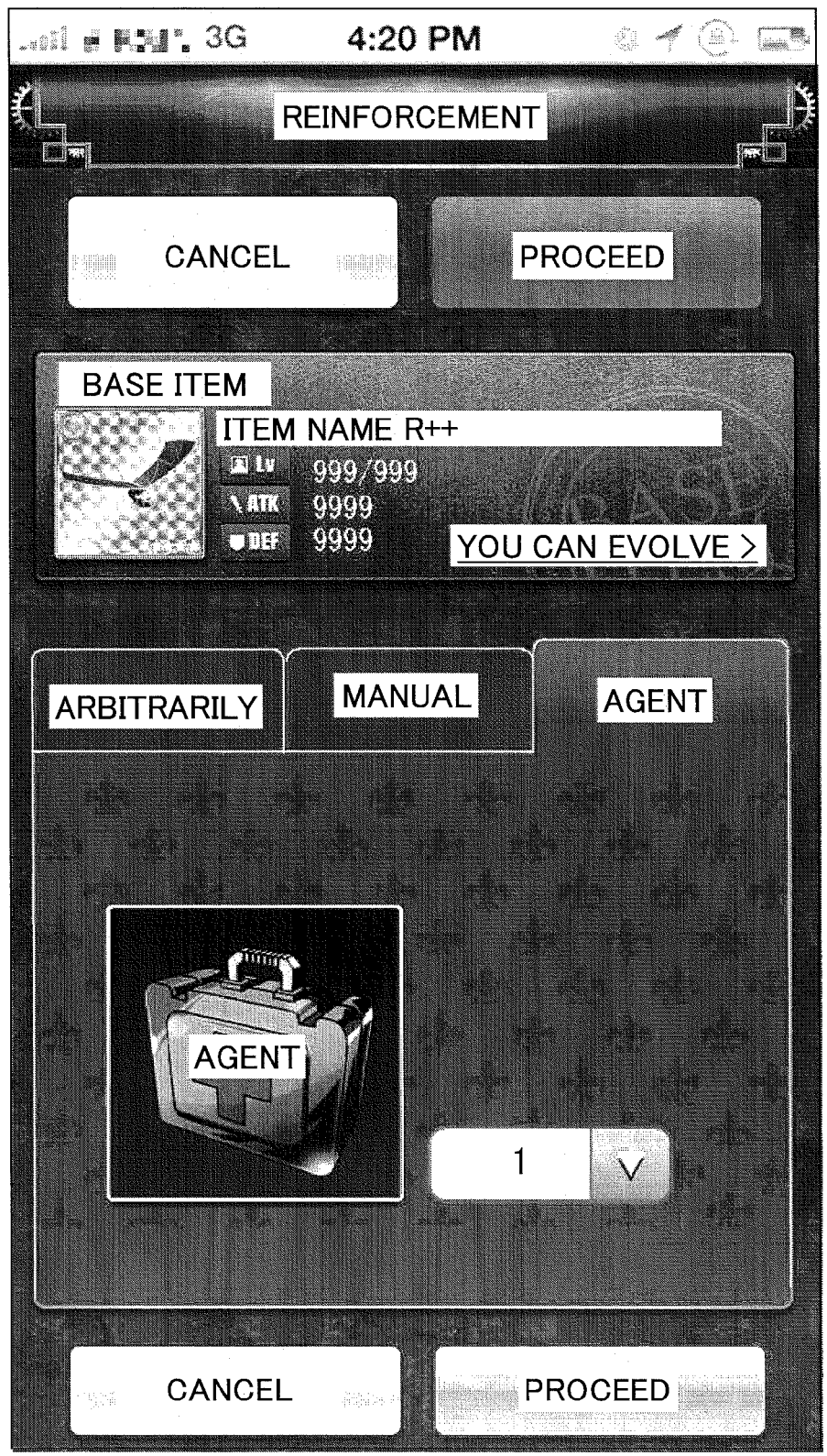
FIG. 10 is a view illustrating another example of a reinforcement screen.

When the previous reinforcement is the "manual selection", as shown in FIG. 9, a reinforcement screen in which a "manual selection" tab (just shown as "manual") is selected is generated and sent. Similarly, when the previous reinforcement is the "reinforcement agent", as shown in FIG. 10, a reinforcement screen in which a "reinforcement agent" tab (just shown as "agent") is selected is generated and sent.

In the "arbitrarily" tab shown in FIG. 8, one or more material items extracted from the items possessed by the player based on the parameter of the base item are displayed. The material items are extracted in order of priorities. For example, high priority is given to an item whose attribute is the same as that of the base item, an item which is not currently used (not armed), or an item with a lower rare degree. Here, it is assumed that when the item whose attribute is the same as that of the base item is selected as the material item to be used for the reinforcement, the ability value of the base item can be largely increased. Thus, the high priority is given for the item whose attribute is the same as that of the base item. Further, as the material item is lost (not to be possessed by the player anymore) by the reinforcement, the high priority is given for the item with the lower rare degree.

Referring back to FIG. 7, the player of the terminal device 1 is capable of selecting a desired tab from the reinforcement screen. When the player operation input unit 11 accepts the selection by the player (step S135), the game logic processing unit 12 changes the displaying tab (step S136). When the "arbitrarily" tab is initially displayed in the reinforcement screen, it is necessary to prepare the contents for the "arbitrarily" tab at the game processing server apparatus 4 side when the reinforcement screen is generated. However, when the other tab is initially displayed in the reinforcement screen, it is unnecessary to prepare the contents for the "arbitrarily" tab when the reinforcement screen is generated and the contents for the "arbitrarily" tab may be filled after the "arbitrarily" tab is selected.

The player of the terminal device 1 is capable of selecting an extraction condition in the "arbitrarily" tab by checking check boxes. For example, in the "arbitrarily" tab shown in FIG. 8, the player can select one or more of the extracting conditions including a check box C1 "except armed item", a check box C2 "except rare" and a check box C3 "same type".

When the check box C1 "except armed item" is checked (selected), the armed items are not extracted as candidates of the material items. When the check box C2 "except rare" is checked (selected), the items which are rare or more are not extracted as candidates of the material items. When the check box C3 "same type" is checked (selected), the items which are the same type as the base material are preferentially extracted as candidates of the material items.

Referring back to FIG. 7, the player of the terminal device 1 changes the extraction condition from the "arbitrarily" tab of the reinforcement screen. When the player operation input unit 11 accepts the change (step S137), under control of the game logic processing unit 12, the server accessing unit 13 sends a request of changing the arbitrarily extraction condition to the game processing server apparatus 4 with the player ID and the selected extraction condition (step S138).

At the game processing server apparatus 4, upon accepting the request, the request processing unit 41 re-extracts "arbitrarily" candidates, generates a new reinforcement screen (step S139), and sends the reinforcement screen to the terminal device 1 (step S140). The game processing server apparatus 4 may send plural reinforcement screens corresponding to patterns of the selection of the check boxes to the terminal device 1. With this operation, at the terminal device 1, every time the check of the check boxes is changed, the reinforcement screen including the items that meet the extraction condition is displayed.

As shown in FIG. 8, initially, the extracted one or more material items are displayed with effective check marks, respectively, which means the respective item can be used as the material item to be incorporated into the base item. When the player wishes not to use some of the items with the effective check marks, the player May release the selection of the item by tapping the displayed item (step S141). When the player operation input unit 11 accepts the tapping by the player, the game logic processing unit 12 updates the status of the displayed items such that the effective check mark of the item tapped by the player is deleted (step S142).

In the "manual selection" tab shown in FIG. 9, the material items can be selected one by one by the player. This suits advanced players so that the material items can be freely customized. In FIG. 9, when the player selects (taps) one of the item images shown as "NO ITEM", an possessing item list is displayed so that the player can select (tap) the material items one by one from the possessing item list.

In the "reinforcement agent" tab shown in FIG. 10, the player may select the number of items specified for the reinforcement.

Referring back to FIG. 7, the player of the terminal device 1 selects the "proceed" in the selected tab screen. When the player operation input unit 11 accepts the selection by the player (step S143), under control of the game logic processing unit 12, the server accessing unit 13 sends a request of the reinforcement to the game processing server apparatus 4 with the player ID and the item IDs of the selected material items (step S144).

At the game processing server apparatus 4, upon accepting the request, the request processing unit 41 calculates the parameter for the reinforcement and updates the player information of the player information database 43 via the player information management unit 42 (step S145). Specifically, the request processing unit 41 updates the parameter of the base item which is reinforced by the material items and treats the material items used for the reinforcement to be not possessed by the player (deletes the material items).

FIG. 11 is an example of a flowchart illustrating an example of an operation of the game processing server apparatus 4 and the terminal device 1 for the application type. In this case, it is assumed that the terminal device 1 also stores a part of the information related to the player of the terminal device 1 stored in the player information database 43 shown in FIG. 4 and the item information database 45 shown in FIG. 5.

In FIG. 11, when the player of the terminal device 1 selects the battle page and the player operation input unit 11 accepts the selection (step S201), under control of the game logic processing unit 12, the server accessing unit 13 sends the request of a battle page to the game processing server apparatus 4 with the player ID (step S202).

At the game processing server apparatus 4, upon accepting the request, the request processing unit 41 selects other players, other than the requested player, who are qualified as a candidate for an opponent in a battle based on attributes, obtains information regarding the selected other players from the player information database 43 via the player information management unit 42 (step S203), and sends the information to the terminal device 1 (step S204).

At the terminal device 1, the game logic processing unit 12 generates a battle page screen in which the information regarding the selected other players are arranged to be selectable based on the information received from the game processing server apparatus 4 and displays the battle page screen (step S205).

When the player of the terminal device 1 selects an opponent from the battle page and instructs the start of the battle, and the player operation input unit 11 accepts the selection and the instruction (step S206), the game logic processing unit 12 determines a battle result based on the attributes of the players such as offense, the defense and the like (step S207).

The game logic processing unit 12 may generate and display a report on ongoing battle screen (step S208). When the player of the terminal device 1 selects continuation in the report on ongoing battle screen and the player operation input unit 11 accepts the selection (step S209), the game logic processing unit 12 continues the game. The game logic processing unit 12 may generate and display a plurality of report on ongoing battle screens. In such a case, the same procedure is repeated.

Thereafter, the game logic processing unit 12 generates a battle result screen and displays it (step S210).

Further, the game logic processing unit 12 sends a request for notifying the battle result to the game processing server apparatus 4 from the server accessing unit 13 (step S211). Then, at the game processing server apparatus 4, the request processing unit 41 updates the player information database 43 via the player information management unit 42 (step S212). Updating of the player information may be performed right after the battle result is confirmed (step S207).

Next, the operation of the reinforcement by the player of the terminal device 1 is explained.

In FIG. 11, when the player of the terminal device 1 selects the my-page and the player operation input unit 11 accepts the selection by the player (step S221), under control of the game logic processing unit 12, the server accessing unit 13 sends a request of obtaining related information to the game processing server apparatus 4 with the player ID (step S222).

At the game processing server apparatus 4, upon accepting the request, the request processing unit 41 obtains the player information including a message or the like of the requested player based on the player ID from the player information database 43 via the player information management unit 42 as the related information and sends the information to the terminal device 1 (step S224).

At the terminal device 1, the game logic processing unit 12 generates a my-page screen based on the information received from the game processing server apparatus 4 and displays the my-page screen (step S225).

When the player of the terminal device 1 selects a reinforcement of a base item from the my-page screen and the player operation input unit 11 accepts the selection by the player (step S226), the game logic processing unit 12 determines whether the current base item exists (step S227).

When the current base item does not exist because the base item is not selected yet, or when the current base item is inactivated because the reinforcement of the selected base item reaches the upper limit, the game logic processing unit 12 generates a base item selection screen in which the items are arranged to be selectable and displays the base item selection screen (step S228).

When the player of the terminal device 1 selects the base item is newly selected from the base item selection screen and the player operation input unit 11 accepts the selection by the player (step S229), under control of the game logic processing unit 12, the server accessing unit 13 sends a request indicating that the selection of the base item is completed to the game processing server apparatus 4 with the player ID and the item ID of the selected item (step S230).

At the game processing server apparatus 4, upon accepting the request, the request processing unit 41 updates the player information database 43 to include the current base item via the player information management unit 42 (step S231). Updating of the player information may be performed after the reinforcement is performed.

Then, when the base item already exists in step S227 or the base item is newly selected, the game logic processing unit 12 generates a reinforcement screen based on the previous reinforcement and the low priority data and displays the generated screen (step S232).

The player of the terminal device 1 is capable of selecting a desired tab from the reinforcement screen. When the player operation input unit 11 accepts the selection by the player (step S233), the game logic processing unit 12 changes the displaying tab (step S234). When the "arbitrarily" tab is initially displayed in the reinforcement screen, it is necessary to prepare the contents for the "arbitrarily" tab when the reinforcement screen is generated. However, when the other tab is initially displayed in the reinforcement screen, it is unnecessary to prepare the contents for the "arbitrarily" tab when the reinforcement screen is generated and the contents for the "arbitrarily" tab may be filled after the "arbitrarily" tab is selected.

The player of the terminal device 1 is capable of selecting an extraction condition in the "arbitrarily" tab by checking check boxes. For example, the player can select one or more of the extracting conditions including the "except armed item", the "except rare" and the "same type".

When the player of the terminal device 1 changes the extraction condition from the "arbitrarily" tab of the reinforcement screen, and the player operation input unit 11 accepts the change (step S235), the game logic processing unit 12 re-extracts "arbitrarily" candidates, generates a new reinforcement screen to be displayed (step S236). With this operation, every time the check of the check boxes is changed, the items that meet the extraction condition are extracted from the items possessed by the player to be displayed.

As shown in FIG. 8, the extracted one or more material items are displayed with effective check marks, respectively, which means the respective item can be used as the material item to be incorporated into the base item. When the player wishes not to use some of the items with the effective check marks, the player may release the selection of the item by tapping the displayed item (step S237). When the player operation input unit 11 accepts the tapping by the player, the game logic processing unit 12 updates the status of the displayed items such that the effective check mark of the item tapped by the player is deleted (step S238).

In the "manual selection" tab, the material items can be selected one by one by the player. This suits advanced players so that the material items can be freely customized.

In the "reinforcement agent" tab, the player may select the number of items specified for the reinforcement.

When the player of the terminal device 1 selects the "proceed" in the selected tab screen and the player operation input unit 11 accepts the selection (step S239), the game logic processing unit 12 calculates the parameter for the reinforcement and updates the player information stored in the terminal device 1 (step S240). Specifically, the game logic processing unit 12 updates the parameter of the base item which is reinforced by the material items and treats the material items used for the reinforcement to be not possessed by the player.

Then, the game logic processing unit 12 sends a request of completion of the reinforcement to the game processing server apparatus 4 via the server accessing unit 13 with the player ID, the parameter value of the base item, and the item ID of the material item that is not possessed by the player anymore (step S241).

At the game processing server apparatus 4, upon accepting the request, the request processing unit 41 updates the player information of the player information database 43 via the player information management unit 42 (step S242). Specifically, the request processing unit 41 updates the parameter of the base item which is reinforced and treats the material items used for the reinforcement to be not possessed by the player (deletes the material items).

As described above, according to the embodiment, following advantages can be obtained.

(1) The player can easily perform a desired reinforcement with a fewer number of actions because the player only needs to remove (tap) items to be left from the candidates arbitrarily extracted.

(2) By storing the kind of reinforcement such as the "arbitrarily", the "manual selection" or the like which is previously used by the player and displaying the tab corresponding to the kind of reinforcement, the tab which is likely to suit the kind of player, a beginner, an advanced player or the like can be initially displayed to the player. Thus, the player can easily perform a desired reinforcement with a fewer number of actions in accordance with the kind of player.

(3) A beginner player can simply perform the reinforcement because the priorities to be selected as the material items for the items possessed by the player are determined based on the parameter (attribute such as the offense, the rare degree, type or the like) of the base and the material items are extracted based on the priorities.

(4) It is possible to customize the material items to be extracted even when the "arbitrarily" is selected by determining the priorities to be selected as the material items for the items possessed by the player based on the predetermined condition (except armed item, except rare, same type as the base item or the like) based on the request (selection of check boxes) from the player terminal 1. Thus, for the player who is used to the game can also be satisfied with the game.

(5) For the items which are once extracted as candidates for the material items but released by the player are given lower priorities. Thus, the player can perform the reinforcement with a fewer number of actions in a next game operation.

The individual constituents of the terminal device 1 and the game processing server apparatus 4 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

According to the embodiment, a desired reinforcement can be performed with a fewer steps.

Although a preferred embodiment of the terminal device 1 and the game processing server apparatus 4 has been specifically illustrated and described, it is to be understood that minor modifications may be made therein without departing from the spirit and scope of the invention as defined by the claims.

The present invention is not limited to the specifically disclosed embodiments, and numerous variations and modifications and modifications may be made without departing from the spirit and scope of the present invention.

The present application is based on and claims the benefit of priority of Japanese Priority Application No. 2012-152177 filed on Jul. 6, 2012, the entire contents of which are hereby incorporated by reference.

What is claimed is:

1. A game processing server apparatus comprising:
   a storing unit that stores a plurality of game contents possessed by a player and parameters of the plurality of the game contents, respectively;
   a game information delivering unit that delivers game information generated based on the parameters of the game contents, respectively, possessed by the player to a player terminal;
   a game content information delivering unit that delivers, based on a request from the player terminal, information of a single base game content selected from the plurality of game contents possessed by the player and information of one or more material game contents selected from the plurality of game contents possessed by the player to the player terminal, the information of the one or more material game contents including marks associated with the one or more material game contents, respectively, each mark indicating that the respective material game content is selected as the material game content for the base game content as an initial value, and when the player of the player terminal releases the mark associated with either of the one or more material game contents, the mark associated with the respective material game content being deleted; and an updating unit that
accepts information regarding whether the one or more material game contents are selected as the actual material game contents by the player from the player terminal,
treats the one or more material game contents selected as the actual material game contents by the player, that are associated with the marks not being deleted, to be not possessed by the player anymore, and
updates the parameter of the base game content by incorporating the one or more material game contents selected as the actual material game contents into the base game content.

2. The game processing server apparatus according to claim 1,
wherein each of the game contents is a game item.

3. The game processing server apparatus according to claim 1,
wherein each of the game contents corresponds to a plurality of the parameters.

4. A game processing server apparatus comprising:
a storing unit that stores a plurality of game contents possessed by a player and parameters of the plurality of the game contents, respectively;
a game information delivering unit that delivers game information generated based on the parameters of the game contents, respectively, possessed by the player to a player terminal;
a game content information delivering unit that delivers, based on a request from the player terminal, information of a single base game content selected from the plurality of game contents possessed by the player and information of one or more material game contents selected from the plurality of game contents possessed by the player to the player terminal, the information of the one or more material game contents including information indicating that the one or more material game contents are selected as the material game contents for the base game content as an initial value; and
an updating unit that
accepts information regarding whether the one or more material game contents are selected as the actual material game contents by the player from the player terminal,
treats the one or more material game contents selected as the actual material game contents by the player to be not possessed by the player anymore, and
updates the parameter of the base game content by incorporating the one or more material game contents selected as the actual material game contents into the base game content,
wherein the game content information delivering unit determines priorities for the game contents possessed by the player, respectively, based on the parameter set for the base game content, and extracts the one or more material game contents in accordance with the determined priorities.

5. The game processing server apparatus according to claim 4,
wherein the game content information delivering unit lowers the priority of the game contents that was selected as the material game contents once but the selection was released by the player.

6. A game processing server apparatus comprising:
a storing unit that stores a plurality of game contents possessed by a player and parameters of the plurality of the game contents, respectively;
a game information delivering unit that delivers game information generated based on the parameters of the game contents, respectively, possessed by the player to a player terminal;
a game content information delivering unit that delivers, based on a request from the player terminal, information of a single base game content selected from the plurality of game contents possessed by the player and information of one or more material game contents selected from the plurality of game contents possessed by the player to the player terminal, the information of the one or more material game contents including information indicating that the one or more material game contents are selected as the material game contents for the base game content as an initial value; and
an updating unit that
accepts information regarding whether the one or more material game contents are selected as the actual material game contents by the player from the player terminal,
treats the one or more material game contents selected as the actual material game contents by the player to be not possessed by the player anymore, and
updates the parameter of the base game content by incorporating the one or more material game contents selected as the actual material game contents into the base game content,
wherein the game content information delivering unit determines priorities for the game contents possessed by the player, respectively, based on a predetermined condition selected by the player terminal, and extracts the one or more material game contents in accordance with the determined priorities.

7. The game processing server apparatus according to claim 6,
wherein the game content information delivering unit lowers the priority of the game contents that was selected as the material game contents once but the selection was released by the player.

8. A non-transitory computer-readable recording medium having recorded thereon a program for a game processing server apparatus that causes a computer to execute functions comprising:
a storing function that stores a plurality of game contents possessed by a player and a plurality of parameters of the plurality of the game contents, respectively;
a game information delivering function that delivers game information generated based on the parameters of the game contents, respectively, possessed by the player to a player terminal;
a game content information delivering function that delivers, based on a request from the player terminal, information of a single base game content selected from the plurality of game contents possessed by the player and information of one or more material game contents selected from the plurality of game contents possessed by the player to the player terminal, the information of the one or more material game contents including marks associated with the one or more material game contents, respectively, each mark indicating that the respective material game content is selected as the material game content for the base game content as an initial value, and when the player of the player terminal releases the mark associated with either of the one or more material game contents, the mark associated with the respective material game content being deleted; and an updating function that
    accepts information regarding whether the one or more material game contents are selected as the actual material game contents by the player from the player terminal,
    treats the one or more material game contents selected as the actual material game contents by the player, that are associated with the marks not being deleted, to be not possessed by the player anymore, and
    updates the parameter of the base game content by incorporating the one or more material game contents selected as the actual material game contents into the base game content.

9. The non-transitory computer-readable recording medium according to claim 8,
    wherein a screen for accepting a selection of the material game contents by the player includes an "arbitrarily" tab and a "manual selection" tab,
    wherein the storing function stores the tab previously used by the player, and
    wherein the tab previously used by the player is displayed on the player terminal display first for a new request.

10. The non-transitory computer-readable recording medium according to claim 8,
    wherein the game content information delivering function determines priorities for the game contents possessed by the player, respectively, based on the parameter set for the base game content, and extracts the one or more material game contents in accordance with the determined priorities.

11. The non-transitory computer-readable recording medium according to claim 10,
    wherein the game content information delivering function lowers, for the next time, the priority of the game contents that was selected as the material game contents once but the selection was released by the player.

12. The non-transitory computer-readable recording medium according to claim 8,
    wherein the game content information delivering function determines priorities for the game contents possessed by the player, respectively, based on a predetermined condition selected by the player terminal, and extracts the one or more material game contents in accordance with the determined priorities.

13. The non-transitory computer-readable recording medium according to claim 12,
    wherein the game content information delivering function lowers, for the next time, the priority of the game contents that was selected as the material game contents once but the selection was released by the player.

14. The non-transitory computer-readable recording medium according to claim 8,
    wherein each of the game contents is a game item.

15. A non-transitory computer-readable recording medium having recorded thereon a program for a terminal device that causes a computer to execute functions comprising:
    a storing function that stores a plurality of game contents possessed by a player and parameters of the plurality of the game contents, respectively;
    a game information generating function that generates game information based on the parameters of the game contents possessed by the player to a player terminal, respectively;
    a game content information obtaining function that obtains, based on a request by a player, information of a single base game content selected from the plurality of game contents possessed by the player and information of one or more material game contents selected from the plurality of game contents possessed by the player to the player terminal, the information of the one or more material game contents including marks associated with the one or more material game contents, respectively, each mark indicating that the respective material game content is selected as the material game content for the base game content as an initial value, and when the player of the player terminal releases the mark associated with either of the one or more material game contents, the mark associated with the respective material game content being deleted; and
    an updating function that
        accepts information regarding whether the one or more material game contents are selected as the actual material game contents by the player from the player,
        treats the one or more material game contents selected as the actual material game contents by the player, that are associated with the marks not being deleted, to be not possessed by the player anymore, and
        updates the parameter of the base game content by incorporating the one or more material game contents selected as the actual material game contents into the base game content.

16. The non-transitory computer-readable recording medium according to claim 15,
    wherein each of the game contents is a game item.

17. The non-transitory computer-readable recording medium according to claim 15,
    wherein the updating function updates, when the player of the player terminal releases the mark associated with either of the one or more material game contents, the information of the one or more material game contents to delete the mark associated with the respective material game content.

* * * * *